United States Patent [19]
Yamanaka et al.

[11] Patent Number: 6,083,563
[45] Date of Patent: Jul. 4, 2000

[54] METHOD OF FORMING A CHIPPING-RESISTANT COMPOSITE PAINT FILM

[76] Inventors: Eiji Yamanaka, 7-8-1, Kuretakecho, Takahama-shi, Aichi 444-1336; Tadahiko Nishi, A24-502, Otokoyamakouro, Yawata-shi, Kyoto 614-8377; Hisaki Tanabe, 7-9, Musashishiba, Yawata, Yawata-shi, Kyoto 614-8052, all of Japan

[21] Appl. No.: 09/118,905

[22] Filed: Jul. 20, 1998

[30] Foreign Application Priority Data

Jul. 18, 1997 [JP] Japan ................................. 9-209677

[51] Int. Cl.⁷ .......................... B05D 3/02; B05D 1/36
[52] U.S. Cl. ........................... 427/407.1; 427/409
[58] Field of Search .......................... 427/333, 407.1, 427/409, 340, 341, 385

[56] References Cited

U.S. PATENT DOCUMENTS

| | | | |
|---|---|---|---|
| 3,194,679 | 7/1965 | Dowling | 427/333 |
| 5,225,248 | 7/1993 | Stephenson | 427/333 |
| 5,242,716 | 9/1993 | Iwase et al. | 427/407.1 |
| 5,510,443 | 4/1996 | Shaffer et al. | 427/333 |
| 5,597,861 | 1/1997 | Nakae et al. | 427/372.2 |
| 5,902,644 | 5/1999 | Okumura et al. | 427/386 |
| 5,905,132 | 5/1999 | Wegner et al. | 427/470 |
| 5,919,856 | 7/1999 | Nishi et al. | 427/470 |

FOREIGN PATENT DOCUMENTS

| | | |
|---|---|---|
| 0 548 845 A1 | 6/1993 | European Pat. Off. . |
| 2 268 499 | 1/1994 | United Kingdom . |
| WO 91/12899 | 9/1991 | WIPO . |

OTHER PUBLICATIONS

WPI XP002081953, AN 88–238787 and JP 63–171681 A abstract, Jul. 15, 1988.

*Primary Examiner*—Diana Dudash
*Attorney, Agent, or Firm*—Pollock, Vande Sande & Amernick

[57] ABSTRACT

The present invention is a method of forming a chipping-resistant composite paint film comprising applying an anti-chipping primer and an intermediate coating successively in the wet-on-wet method onto a electrodeposition coat baked on a substrate and baking the two wet coat in one step, wherein the anti-chipping primer comprises (a) an aqueous dispersion of an ethylene copolymer, (b) a water-based urethane resin, and (c-1) a water-miscible organic solvent having a boiling point of not lower than 80° C. and of not higher than the baking temperature of the paint, or (c-2) a melamine resin.

The present invention ensures improved appearance and chipping resistance of the paint film.

25 Claims, No Drawings

METHOD OF FORMING A CHIPPING-RESISTANT COMPOSITE PAINT FILM

FIELD OF THE INVENTION

The present invention relates to a method of forming a chipping-resistant composite paint film with improved appearance and chipping resistance.

BACKGROUND ART

In the current typical car body finishing, an electrodeposition coating is first applied to the substrate steel surface and baked and, then, an anti-chipping primer, an intermediate coat, a base coat, and a clear top coat are applied in succession.

In recent years, much research has been undertaken for establishing a coating system using water-based coatings in lieu of solvent-based coatings for reducing the release of VOC in the atmosphere and, from the standpoint of energy conservation, applying and baking the successive coats by the two-coat/one-bake method.

Japanese Kokai Publication Hei-6-9925 discloses an anti-chipping primer comprising an aqueous dispersion of an 2-alkenoic acid-ethylene copolymer and a water-based polyurethane resin as film-forming resin components. Japanese Kokai Publication Hei-7-252449 and Japanese Patent Application Hei-8-354881, for instance, discloses a water-based intermediate coating comprising a polyester such that a polyalkadienediol or hydrogenated alkadienediol has been incorporated in the polyester chain.

However, it has been discovered that when such an anti-chipping primer and an intermediate coating are applied by the two-coat/one-bake method to provide a chipping-resistant composite paint film, several troubles are inevitable.

The chipping-resistant composite paint film is used to protect the paint of the running car body against the injury caused by gravels sent flying and impinging on the body. Therefore, the anti-chipping primer is selectively applied to the strategic surface area in the lower zone of the car body which is usually subject to the impact of flying gravels. In actual coating practice, the anti-chipping primer is sprayed against said strategic area, with the result that there is created a discontinuous dot-pattern of the spattered anti-chipping primer around said strategic area where a continuous film is formed. When, thereafter, an intermediate coating is applied to the whole body surface inclusive of the continuous film area and discontinuous dot area in the wet-on-wet method and the two coats are baked together to provide a composite paint film, the overall appearance of the finish is sacrificed due to the presence of said discontinuous dot-pattern.

Under the circumstances, the inventors of the present invention modified an anti-chipping primer in such a manner that although it would form a discrete layer, independent of the subsequently applied intermediate coating layer, in the continuous film area, it would be at least partially compatible with the intermediate coating to form an integral layer in the discontinuous dot area, thus succeeding in realizing an improved appearance of the composite paint film.

SUMMARY OF THE INVENTION

The present invention relates to a method of forming a chipping-resistant composite paint film which comprises applying an anti-chipping primer and an intermediate coating successively in the wet-on-wet method onto a electrodeposition coat baked on a substrate and baking the two wet coats in one step.

The anti-chipping primer according to the present invention comprises (a) an aqueous dispersion of an ethylene copolymer containing not less than 10 weight % of an 2-alkenoic acid monomer, (b) water-based urethane resin, and (c) at least one kind selected from the group consisting of (c-1) water-miscible organic solvents having a boiling point of not lower than 80° C. and of not higher than the baking temperature of the paint, and (c-2) melamine resins, said (c-1) accounting for 0.5 to 15% of the total weight of the anti-chipping primer, said (c-2) accounting for 5 to 30% of the total weight of the anti-chipping primer.

The intermediate coating for use in the present invention is a melamine-curable polyester water-based coating, particularly a polyester series water-based coating containing a hydroxyl-terminated polyalkadiene oligomer, a hydrogenation product thereof, or a long-chain aliphatic polyol of 18 to 60 carbon atoms, as a polyol component of its polyester chain.

In accordance with the present invention, when said component (c) is added to an anti-chipping primer, the undried anti-chipping primer forms an independent layer not intermingling with the intermediate coating superimposed in the wet-on-wet coating method in the continuous film area, but intermingles with the intermediate coating at least in part to form an integral layer in the discontinuous dot area so that the overall appearance of the paint film is improved.

DETAILED DISCLIPTION OF THE INVENTION

Anti-chipping Primer

As mentioned above, a water-based anti-chipping primer not containing component (c) has been described in Japanese Kokai Publication Hei-6-9925. The component (a) of this primer described in this Publication his an aqueous dispersion of an ethylene copolymer which is obtainable by copolymerizing a 2-alkenoic acid, typically acrylic acid or methacrylic acid, in a proportion of not less than 20 weight % of the monomer mixture with ethylene and optionally further with a small proportion of one or more other ethylenically unsaturated monomers. This ethylene copolymer has carboxyl groups directly attached to the polymer backbone chain. The ethylene-acrylic acid copolymer (EAA) finds application as a hot-melt adhesive and ethylene-methacrylic acid copolymer is known as a metal-crosslinkable ionomer.

According to the present invention, the ethylene copolymer of this kind which can be used as component (a) of the anti-chipping primer are commercially available under the trade names of Primacor™ 1405, 1410, 1420, 1430, 3440, 3460, 5980 and 5990 (Dow Chemical) and Nucrel™ N1530, N2030, 2050H, 2060, N1050H, N1108C, N1110H, N1207, N1214, N1525, and N1560 (Mitsui-DuPont Chemical).

The aqueous dispersion of such an ethylene copolymer (a) is prepared by dispersing the copolymer in a neutralizing base-containing aqueous medium. The neutralizing base which can be used includes ammonia and amines vaporizable at a temperature of not higher than the baking temperature of the coat, such as trimethylamine, triethylamine, tripropylamine, N,N-dimethylethanolamine, pyridine, 4-methylmorpholine, and so forth. Preferably, such a base is used in a proportion of 1.2 to 2.4 mmols, more preferably 1.4 to 2.0 mmoles per gram of the non-volatile matter of the copolymer. Thus, said aqueous dispersion (a) can be obtained by adding a necessary amount of the ethylene copolymer to an aqueous solution containing such a neutralizing base when hot, stirring the mixture under heating to thoroughly dissolve or disperse the copolymer, and letting the solution cool gradually. In this connection, the proportion of the non-volatile matter of the resin in the aqueous dispersion (a) is preferably 10 to 50 weight %, particularly 20 to 40 weight %.

In the present invention, the water-based urethane resin as component (b) is an aqueous emulsion of reactive or non-reactive polyurethane as described in Japanese Kokai Publication Hei-6-9925. Such emulsions have been broadly used for air-permeable water-proofing of fabrics or in the manufacture of synthetic leather and are commercially available under the trade names of NeoRez™ R-940, R-941, R-960, R-962, R-966, R-967, R-9603, R-9637, R-9618, R-9619, XR-9624, Bondic™ 1310NSC (all from ICI) and Hydran HW-310, HW-311, HW-312B, HW-301, HW-111, HW-140, HW-333, HW-340, HW-350, HW-910, HW-920, HW-930, HW-935, HW-940, HW-960, HW-970, HW-980, AP-10, AP-20, AP-30, AP-40, AP-60, AP-70, and AP-60LM (Dainippon Ink and Chemicals). The non-volatile content of the resin for component (b) is also preferably in the range of 10 to 50 weight %.

When the component (c) in the present invention is an organic solvent (c-1), it should be a water-miscible organic solvent capable of functioning as a cosolvent for the polyester in the intermediate coating. Moreover, the physical properties of the water-miscible organic solvent (c-1) should be such that it should be retained in the primer during the period following application of the anti-chipping primer till application of the intermediate coating throughout the continuous film area and marginal discontinuous dot area but be vaporized off from the coating in the baking step. For this reason, an organic solvent with a boiling point within the range of 80 to 350° C., preferably 100 to 220° C., is selected as the component (c-1). The preferred solvent satisfying the above conditions includes glycol monoalkyl ethers such as methoxybutanol, methoxypropanol, butylcellosolve, 2-butoxypropanol, diethylene glycol monomethyl ether, hexylcellosolve, etc. Particularly preferred are methoxypropanol, butylcellosolve, and hexylcellosolve.

Since components (a) and (b) are not those resins which cure on crosslinking with an external crosslinking agent, the melamine resin (c-2) used for component (c) may be a self-curing melamine resin. However, it should be a resin such that it does not intermingle with the intermediate coating in the continuous area during application of the intermediate coating and subsequent baking but intermingles with the melamine resin-containing intermediate coating at least in part in the discontinuous dot area to form an integral layer. Preferably, a water-soluble melamine resin or a water-dispersible melamine resin is used as the melamine resin (c-2).

The melamine resin (c-2) satisfying the above conditions include commercial products such as Cymel™ C-202, C-232, C-235, C-238, C-254, C-266, C-267, C-272, C-285, C-301, C-303, C-325, C-327, C-350, C-370, C-701, C-703, C-736, C738, C-771, C-1141, C-1156, C-1158 (Mitsui Cytech), U-Van™ 120, 20HS, 2021, 2028, 2061 (Mitsui Toatsu), and Melan 522 (Hitachi Kasei).

The anti-chipping primer may of course contain colored pigments such as carbon black, titanium dioxide, etc., extenders, and other conventional paint additives. The preferred ratio of component (a), i.e. said aqueous dispersion of an ethylene copolymer, to component (b), i.e. said water-based urethane resin, is 2:8 through 5:5 based on the non-volatile matter of the resin.

The proportion of component (c) based on the total weight of said anti-chipping primer is 0.5 to 15%, particularly 0.5 to 5%, for said water-miscible organic solvent (c-1), or 5 to 30%, particularly 5 to 25%, for said melamine resin (c-2). The component (c) may be used singly, or the water-miscible organic solvent (c-1) and the melamine resin (c-2) may be used combination. When both of the water-miscible organic solvent (c-1) and the melamine resin (c-2) are used, the proportion of the total component (c) combining said (c-1) with said (c-2) may be 0.5 to 45% based on the total weight of the anti-chipping primer.

Intermediate Coating

A melamine-curable polyester series water-based coating is used. As is well known, a polyester is a polycondensate between a polyol and a polycarboxylic acid. It may contain a minor proportion of additional ingredients such as monocarboxylic acids, hydroxycarboxylic acids, lactones, etc. Examples of polyesters include alkyd resins containing a drying oil or semi-drying oil and the corresponding fatty acids.

Since the intermediate coating for use in the present invention should be a water-based coating, an acidic groups are introduced by utilizing the ring-opening reaction of a polycarboxylic anhydride with the polyester chain hydroxyl groups or a trifunctional or polyfunctional polycarboxylic acid such as trimellitic anhydride is used as part of the polycarboxylic acid component in the synthesis of the polyester chain so that at least one of the available carboxylic groups is introduced as a pendant acidic group. Just as described for the anti-chipping primer, such a carboxyl-containing polyester resin is dispersed in a neutralizing base-containing aqueous medium and, with addition of a melamine curing agent, processed into a water-based coating.

Such water-based polyester resin coatings are well known in the field of coatings and can be utilized as the intermediate coating in the present invention as well. For the purposes of the invention, however, it is especially recommendable to employ the water-based polyester intermediate coating described in Japanese Kokai Publication Hei-7-252449 and Japanese Patent Application Hei-8-354881, for instance. Such a coating is one such that the impact resistance of the coat has been improved by using a polyalkadienediol or hydrogenation product thereof with a degree of polymerization in the range of 5 to 50 as the polyol component for synthesis of a polyester chain so as to introduce an elastomer segment into the chain. Thus, for the introduction of an acidic group into the polyester chain, a 2,2-bis (hydroxymethyl)alkanoic acid such as 2,2-dihydroxypropionic acid is used as part of the polyol component so that the carboxyl group of said acid may remain unreacted. The acid thus incorporated in the polyester chain is more stable against hydrolysis than the acid introduced by utilizing the ring-opening reaction of a polycarboxylic anhydride by a hydroxyl group.

In the above two methods, a long-chain aliphatic polyol of 18~60 carbon atoms may be used as the polyol component for synthesis of the polyester chain either in lieu of said polyalkadienediol or in combination with the latter. Such a long-chain aliphatic polyol can be obtained by dimerizing or trimerizing a saturated or unsaturated aliphatic alcohol of 8 to 22 carbon atoms. Diols known as dimer alcohols or dimer aliphatic alcohols are preferred. Particularly preferred is a dimerized diol of 36 carbon atoms. Dimer aliphatic alcohols can be obtained by reducing dimer fatty acids with hydrogen. As a commercial product, a dimer diol of 36 carbon atoms is available under the trade name of Sovermol 908 from Henkel Japan.

In the polyester resin, at least one kind selected from the group consisting of said polyalkadienediols having a degree of polymerization within the range of 5 to 50, hydrogenation products thereof, and long-chain aliphatic polyols of 18 to 60 carbon atoms, accounts for 1 to 40 weight % of the total reactant monomer composition forming the polyester resin, preferably.

The melamine resin which can be used for the intermediate coating includes methylolated melamine and the corresponding resins in which some or all of methylol groups have been etherified with an alcohol such as methanol, ethanol, n-butyl alcohol, or isobutyl alcohol, etc. Its formulating amount can be generally in the range of polyester resin/melamine=6:4 through 8:2 based on the non-volatile matter of the resin. The catalyst which can be used includes various acid catalysts such as p-toluenesulfonic acid, dodecylbenzenesulfonic acid, nonylnaphthalenesulfonic acid, and acid catalysts available upon blocking those sulfonic acids with an amine. A blocked polyisocyanate curing agent may be used in combination with melamine resin.

The intermediate coating may also contain pigments and other conventional additives.

Coating Method

The chipping-resistant composite paint film of the invention is formed on an electrodeposition coat baked onto a substrate which is typically a car body. The electrodeposition coat may be whichever of an anionic coat and a cationic coat but the cationic one is popular these days.

The anti-chipping primer is applied in a dry film thickness of 1 to 20 μm over the strategical area, that is to say the area which would be subject to the impact of flying gravels. Then, after a setting time of 1 to 10 minutes, usually 2 to 5 minutes, the intermediate coat is applied in the wet-on-wet method in a dry film thickness of 20 to 50 μm, optionally preheated at 40 to 80° C. for 5 to 10 minutes, and heated at 120 to 160° C. for 15 to 30 minutes to bake the anti-chipping primer and intermediate coating in one step. The coating technique may be spray coating or electrostatic coating.

After this formation of a chipping-resistant composite paint film, a top coating is applied by a well-known method. The commonest coating system is a two-coat/one-bake system in which a pigment-containing base coat is first applied and a clear coat is then applied in the wet-on-wet method, followed by baking in one operation. Of course, a two-coat/two-bake system may also be employed. In the two-coat/one-bake system, both coats may be solvent-based but optionally a powdery clear coat may be applied onto a water-based base coat. Such top coating techniques are well known and since they do not constitute part of the invention, no further description will be needed.

EXAMPLES

In the following production examples and working examples, all parts and % are by weight.

Production Example 1
Anti-chipping Primer A

To 200 parts of deionized water was added 10 parts of 25% aqueous ammonia, and the mixture was heated to 95° C. Then, 90 parts of Primacor 5980 (Dow Chemical; EAA with an acrylic acid content of 20%) was added and stirred to dissolve at that temperature. The solution was allowed to cool spontaneously to provide an aqueous dispersion of EAA with a non-volatile content of 30%. This dispersion was designated as ethylene copolymer dispersion I.

Of the above dispersion, 84 parts were taken and premixed with 2.8 parts of carbon black and 13.2 parts of deionized water. Then, in a paint conditioner, glass beads were added and the mixture was dispersed at room temperature for 1 hour to provide a pigment dispersion paste with a particle diameter of not greater than 5 μm and a non-volatile content of 28%.

The above aqueous EAA dispersion was mixed with said pigment dispersion paste and Hydran HW-333 (Dainippon Ink and Chemicals; aqueous polyurethane emulsion) in an EAA/polyurethane ratio of 4/6 based on the non-volatile matter. Then, methoxypropanol in an amount corresponding to 5% of the whole coating was added to provide an anti-chipping primer A with a pigment concentration of 4 weight % and a non-volatile content of 30%.

Production Example 2 to 14
Anti-chipping Primers B to N

In the same manner as Production Example 1, 90 parts of EAA with an acrylic acid content of 20% was neutralized with 16 parts of triethylamine to prepare an aqueous dispersion with a non-volatile content of 25%, which was designated as ethylene copolymer dispersion II. On the other hand, 90 parts of EMA (ethylene-methacrylic acid copolymer) with a methacrylic acid content of 20% was neutralized with 18 parts of dimethylethanolamine to prepare an aqueous dispersion with a non-volatile content of 30%, which was designated as ethylene copolymer dispersion III.

The ethylene copolymer dispersions I to III were respectively mixed with the pigment paste prepared from the same dispersion in the same manner as in Production Example 1, an aqueous polyurethane emulsion, and a solvent or a melamine resin in the proportions based on the non-volatile matter shown in Tables 1 and 2 to prepare anti-chipping primers B to J (Examples) and K to N (Comparative Examples), with a pigment concentration of 4% and a non-volatile content of 30%.

The aqueous polyurethane emulsion used are as follows.
I: Hydran HW-333 (Dainippon Ink and Chemicals)
II: NeoRez R-962 (ICI)
III: Bondic 1310NSC (ICI)
IV: Hydran HW-312B (Dainippon Ink and Chemicals)

|  | Production Example | | | | | | |
|---|---|---|---|---|---|---|---|
|  | 1 | 2 | 3 | 4 | 5 | 6 | 7 |
| An anti-chipping primer | A | B | C | D | E | F | G |
| Component(a) ethylene copolymer | I | II | II | III | III | III | III |
| Component(b) polyurethane | I | II | II | III | IV | I | I |
| (a)/(b) based on the non-volatile matter | 4/6 | 3/7 | 3/7 | 5/5 | 3/7 | 4/6 | 3/7 |
| Methoxypropanol | 5% | 5% | — | 5% | — | — | — |
| Butylcellosolve | — | — | 5% | — | — | — | — |
| Hexylcellosolve | — | — | — | — | 1% | — | — |
| Diethylene glycol monomethyl ether | — | — | — | — | — | 1% | — |
| 2-Butoxypropanol | — | — | — | — | — | — | 5% |

|  | Production Example | | | | | | |
|---|---|---|---|---|---|---|---|
|  | 8 | 9 | 10 | 11 | 12 | 13 | 14 |
| An anti-chipping primer | H | I | J | K | L | M | N |
| Component(a) ethylene copolymer | III | III | III | II | II | III | III |

-continued

| | Production Example | | | | | | |
|---|---|---|---|---|---|---|---|
| | 8 | 9 | 10 | 11 | 12 | 13 | 14 |
| Component(b) polyurethane | I | I | I | II | II | I | I |
| (a)/(b) based on the non-volatile matter | 3/7 | 3/7 | 3/7 | 3/7 | 3/7 | 3/7 | 3/7 |
| U-van 2061 | 15% | — | — | — | — | — | — |
| Cymel C-303 | — | 20% | 15% | — | — | 35% | — |
| Hexylcellosolve | — | — | 1% | — | — | — | — |
| Methanol | — | — | — | 0.3% | — | — | — |
| Diethylene glycol | — | — | — | — | 20% | — | — |

Production Example 15
Aqueous Intermediate Coating A

| Component | Parts by weight |
|---|---|
| Coconut oil | 147 |
| Trimethylolpropane | 274 |
| 1,4-Cyclohexanedicarboxylic acid | 300 |
| Adipic acid | 64 |
| Dimethylolated butanoic acid | 116 |
| Epol | 100 |
| ε-Caprolactone | 93 |
| Dibutyltin oxide | 2 |
| Solvesso #150 | 90 |
| Butylcellosolve | 90 |

A reactor equipped with a heater, stirrer, nitrogen inlet tubing, and fractional distillation column was charged with 147 parts by weight of coconut oil, 274 parts by weight of trimethylolpropane, and 2 parts by weight of dibutyltin oxide and the charge was heated under dry nitrogen gas to prepare a melt. Then, the temperature was gradually increased to 210° C. for transesterification. After cooling, 300 parts by weight of 1,4-cyclohexanedicarboxylic acid, 64 parts by weight of adipic acid, 116 parts by weight of dimethylolated butanoic acid, and 100 parts by weight of Epol (Idemitsu Petrochemical: hydrogenated polyisoprenediol, mol. wt.=1860, average number of repeats (n)=26) were added and the temperature was increased gradually to 210° C. for dehydrative esterification. This dehydrative esterification was carried out until an acid value of 55 was obtained and after cooling to 140° C., then, 93 parts by weight of ε-caprolactone was added and reacted for 1 hour to carry through the reaction. To the resulting polyester resin were added 90 parts by weight of Solvesso #150 (Esso Chemical; an aromatic hydrocarbon solvent) and 90 parts by weight of butylcellosolve to provide a polyester resin with a non-volatile content of 85% [polyester resin (1)]. This polyester resin had a hydroxyl value of 150, an acid value of 50, and a number average molecular weight of 2770 (on a polystyrene basis).

The polyester resin thus obtained was heated to 60° C. and dimethylethanolamine was added in an amount sufficient to give a neutralization degree of 80% with respect to the carboxylic acid in the resin,. Then, a sufficient amount of deionized water was added to make a non-volatile content of 40% to provide an aqueous polyester resin varnish (A).

Pigment Dispersion Paste

To 100 parts by weight of aqueous polyester varnish A were added 30 parts by weight of deionized water, 130 parts by weight of rutile titanium dioxide, and 1 part by weight of carbon black, and after preliminary mixing, glass beads were added in a paint conditioner. The mixture was dispersed at room temperature for 1 hour to provide a pigment dispersion paste with a particle diameter of not greater than 5μ and a nonvolatile fraction of 65.4%.

Coating Composition

To 111 parts by weight of aqueous polyester varnish A was added 200 parts by weight of the pigment paste prepared from the same aqueous polyester varnish, followed by addition of 25 parts by weight of hexamethoxymethylolmelamine and 0.5 part by weight of p-toluenesulfonic acid to provide an intermediate coating A.

Production Example 16
Water-based Intermediate Coating B

| Component | Parts by weight |
|---|---|
| Coconut oil | 137 |
| Trimethylolpropane | 201 |
| Phthalic anhydride | 283 |
| Adipic acid | 70 |
| Hexahydrophthalic anhydride | 79 |
| Neopentyl glycol | 83 |
| Sovermol 908 (Henkel Japan, $C_{36}$ dimer diol) | 142 |
| ε-Caprolactone | 94 |
| Xylene | 21 |
| Solvesso #150 | 81 |
| Butylcellosolve | 81 |

Using the above recipe, the procedure of Production Example 15 was otherwise repeated to provide a polyester resin.

Then, using this polyester resin, a water-based polyester resin varnish (B) was prepared as in Production Example 15.

To 111 parts by weight of water-based polyester varnish B was added 200 parts by weight of a pigment paste prepared in the same manner as described in Production Example 15, followed by addition of 25 parts by weight of hexamethoxymelamine and 0.5 part by weight of p-toluenesulfonic acid to provide an intermediate coating B.

Production Example 17
Water-based Intermediate Coating C

| Component | Parts by weight |
|---|---|
| Coconut oil | 147 |
| Trimethylolpropane | 217 |
| 1,4-Cyclohexanedicarboxylic acid | 306 |
| Adipic acid | 65 |
| Dimethylolated butanoic acid | 117 |
| PIP* | 100 |
| ε-Caprolactone | 92 |
| Dibutyltin oxide | 2 |
| Solvesso #150 | 90 |
| Butylcellosolve | 90 |

*Polyisoprenediol, molecular weight 2400, average degree of polymerization = 34, Idemitsu Petrochemical.

Using the above recipe, a polyester resin was prepared in otherwise the same manner as in Production Example 15. Then, using the polyester resin, a water-based polyester varnish C was prepared as in Production Example 15.

To 111 parts by weight of water-based polyester varnish C were added 200 parts by weight of a pigment paste prepared as in Production Example 15 and 0.5 part by weight of p-toluenesulfonic acid to provide an intermediate coating C.

Examples 1 to 10 and Comparative Examples 1 to 4

On zinc phosphate-treated dull steel sheets, 7 cm×15 cm×0.8 cm, a cationic electrodeposition coating (Nippon Paint, Power-top U-226E) was applied in a dry film thickness of about 20 μm and baked at 165° C. for 30 minutes. The sheets were then spray-coated with the anti-chipping primer in a dry thickness of about 10 μm with patterning of a continuous coating area and a discontinuous coating area and after 3 minutes the intermediate coating was applied in superimposition in a dry film thickness of about 35 μm, followed by baking at 140° C. for 30 minutes. Thereafter, an acrylic resin series base coating (Nippon Paint, Superlac M-155 Silver) was applied in a dry film thickness of about 15 μm and after an interval of 3 minutes, a clear paint (Nippon Paint, Superlac O-150) was further applied in a dry film thickness of about 30 μm on a in the wet-on-wet method basis, followed by baking at 140° C. for 30 minutes to provide test coated sheets.

For the respective test coated sheets, the appearance and chipping resistance of the paint film were evaluated by the following test protocols and criteria. The results are presented in Tables 3 and 4.

Test Protocols and Criteria

1. Appearance of the Paint Film

The surface shrinkage, blurring, and blushing of each testpiece coated up to the top clear coat were visually evaluated according to the following 5-point schedule.
5: Excellent
4: Good
3: Medium
2: Slightly poor
1: Poor 2. Chipping Resistance Using a Graverro tester, 50 g of #7 crushed stones were caused to impinge from the distance of 35 cm upon the testpiece precooled to −20° C. under a air pressure of 4.0 kg/cm² at an angle of 90° and the degree of peeling was visually examined and rated on a 5-point scale with the degree for the paint film applied without using an anti-chipping primer (Comparative Examples) being taken as 1.
5: Excellent
4: Good
3: Medium
2: Slightly poor
1: Poor 3. Storage Stability of the Anti-chipping Primer Using Ford Cup No. 4, each anti-chipping primer was adjusted to an initial viscosity of 30 seconds at 20° C. The primer was left standing at 40° C. for 240 hours and the storage stability was evaluated from the change in Ford Cup viscosity at 20° C.
⊙: ≦±5 seconds
○: ≦±10 seconds
Δ: ≧±10 seconds but fluidity retained
×: Fluidity lost

| | Example | | | | | | | | | |
|---|---|---|---|---|---|---|---|---|---|---|
| | 1 | 2 | 3 | 4 | 5 | 6 | 7 | 8 | 9 | 10 |
| Anti-chipping primer | A | B | C | D | E | F | G | H | I | J |
| An intermediate coating | A | A | B | C | B | A | B | A | A | B |

-continued

| | Example | | | | | | | | | |
|---|---|---|---|---|---|---|---|---|---|---|
| | 1 | 2 | 3 | 4 | 5 | 6 | 7 | 8 | 9 | 10 |
| Appearance of continuous film | 5 | 5 | 5 | 4 | 4 | 5 | 5 | 5 | 5 | 4 |
| Appearance of discontinuous dot area | 5 | 5 | 5 | 5 | 5 | 5 | 5 | 5 | 5 | 5 |
| Chipping resistance | 5 | 4 | 5 | 5 | 5 | 5 | 5 | 5 | 5 | 5 |
| Storage stability of anti-chipping primer | ○ | ○ | ○ | ○ | ⊙ | ⊙ | ⊙ | ⊙ | ⊙ | ⊙ |

| | Comparative Example | | | |
|---|---|---|---|---|
| | 1 | 2 | 3 | 4 |
| Anti-chipping primer | K | L | M | N |
| An intermediate coating | B | C | A | A |
| Appearance of continuous film | 4 | 1 | 1 | 5 |
| Appearance of discontinuous dot area | 1 | 5 | 5 | 1 |
| Chipping resistance | 5 | 1 | 1 | 5 |
| Storage stability of anti-chipping primer | ⊙ | Δ | ⊙ | ⊙ |

What is claimed is:

1. A method of forming a chipping-resistant composite paint film which comprises applying serially on an electrodeposition coat baked onto a substrate, an anti-chipping primer and an intermediate coating in the order in the wet-on-wet method and baking the two wet coats in one step, wherein said anti-chipping primer comprises (a) an aqueous dispersion of an ethylene copolymer containing at least 10 weight % of a 2-alkenoic acid monomer, (b) a water-based urethane resin, and (c) at least one member selected from the group consisting of (c-1) water-miscible organic solvents having a boiling point not of lower than 80° C. and of not higher than the baking temperature of the paint and (c-2) melamine resins, said water-miscible organic solvents (c-1), when present, accounting for 0.5 to 15% of the total weight of said anti-chipping primer, said melamine resins (c-2), when present, accounting for 5 to 30% of the total weight of said anti-chipping primer, and said intermediate coating is a melamine-curable polyester water-based coating containing a melamine curing agent.

2. A method of forming a chipping-resistant composite paint film according to claim 1 wherein said components (a) and (b) occur in a ratio of 2:8 to 5:5 based on the non-volatile matter in said anti-chipping primer.

3. A method of forming a chipping-resistant composite paint film according to claim 1 wherein said component (a) in said anti-chipping primer is neutralized with 1.2 to 2.4 mmoles of ammonia or an amine vaporizable at a temperature of not higher than the baking temperature of the coat, per gram of the non-volatile matter thereof.

4. A method of forming a chipping-resistant composite paint film according to claim 1 wherein said component (c) in said anti-chipping primer is a glycol monoalkyl ether added in a proportion of 0.5 to 5% of the total weight of said anti-chipping primer.

5. A method of forming a chipping-resistant composite paint film according to claim 1 wherein said component (c) in said anti-chipping primer is a water-soluble melamine resin or a water-dispersible melamine resin added in a proportion of 5 to 25% of the total weight of said anti-chipping primer.

6. A method of forming a chipping-resistant composite paint film according to claim 1 wherein said intermediate coating is a melamine-curable polyester water-based coating comprising a polyester resin which comprises at least one member selected from the group consisting of polyalkadienediols having a degree of polymerization within the range of 5 to 50, a hydrogenation products thereof, and long-chain aliphatic polyols of 18 to 60 carbon atoms in a proportion of 1 to 40 weight % of the total reactant composition forming the polyester resin.

7. A method of forming a chipping-resistant composite paint film according to claim 1 wherein said anti-chipping primer is applied in a dry film thickness of 1 to 20 μm and said intermediate coating is applied in a dry film thickness of 20 to 50 μm.

8. A method of forming a chipping-resistant composite paint film according to claim 2 wherein said anti-chipping primer is applied in a dry film thickness of 1 to 20 μm and said intermediate coating is applied in a dry film thickness of 20 to 50 μm.

9. A method of forming a chipping-resistant composite paint film according to claim 3 wherein said anti-chipping primer is applied in a dry film thickness of 1 to 20 μm and said intermediate coating is applied in a dry film thickness of 20 to 50 μm.

10. A method of forming a chipping-resistant composite paint film according to claim 4 wherein said anti-chipping primer is applied in a dry film thickness of 1 to 20 μm and said intermediate coating is applied in a dry film thickness of 20 to 50 μm.

11. A method of forming a chipping-resistant composite paint film according to claim 5 wherein said anti-chipping primer is applied in a dry film thickness of 1 to 20 μm and said intermediate coating is applied in a dry film thickness of 20 to 50 μm.

12. A method of forming a chipping-resistant composite paint film according to claim 6 wherein said anti-chipping primer is applied in a dry film thickness of 1 to 20 μm and said intermediate coating is applied in a dry film thickness of 20 to 50 μm.

13. The method according to claim 1, wherein said anti-chipping primer is a water-based anti-chipping primer.

14. A method of forming a chipping-resistant composite paint film according to claim 13 wherein said components (a) and (b) occur in a ratio of 2:8 to 5:5 based on the non-volatile matter in said anti-chipping primer.

15. A method of forming a chipping-resistant composite paint film according to claim 13 wherein said component (a) in said anti-chipping primer is neutralized with 1.2 to 2.4 mmoles of ammonia or an amine vaporizable at a temperature of not higher than the baking temperature of the coat, per gram of the non-volatile matter thereof.

16. A method of forming a chipping-resistant composite paint film according to claim 13 wherein said component (c) in said anti-clipping primer is a glycol monoalkyl ether added in a proportion of 0.5 to 5% of the total weight of said anti-chipping primer.

17. A method of forming a chipping-resistant composite paint film according to claim 13 wherein said component (c) in said anti-chipping primer is a water-soluble melamine resin or a water-dispersible melamine resin added in a proportion of 5 to 25% of the total weight of said anti-chipping primer.

18. A method of forming a chipping-resistant composite paint film according to claim 13 wherein said intermediate coating is a melamine-curable polyester water-based coating comprising a polyester resin which comprises at least one member selected from the group consisting of polyalkadienediols having a degree of polymerization within the range of 5 to 50, a hydrogenation products thereof, and long-chain aliphatic polyols of 18 to 60 carbon atoms in a proportion of 1 to 40 weight % of the total reactant composition forming the polyester resin.

19. A method of forming a chipping-resistant composite paint film according to claim 13 wherein said anti-chipping primer is applied in a dry film thickness of 1 to 20 μm and said intermediate coating is applied in a dry film thickness of 20 to 50 μm.

20. A method of forming a chipping-resistant composite paint film according to claim 14 wherein said anti-chipping primer is applied in a dry film thickness of 1 to 20 μm and said intermediate coating is applied in a dry film thickness of 20 to 50 μm.

21. A method of forming a chipping-resistant composite paint film according to claim 15 wherein said anti-chipping primer is applied in a dry film thickness of 1 to 20 μm and said intermediate coating is applied in a dry film thickness of 20 to 50 μm.

22. A method of forming a chipping-resistant composite paint film according to claim 16 wherein said anti-chipping primer is applied in a dry film thickness of 1 to 20 μm and said intermediate coating is applied in a dry film thickness of 20 to 50 μm.

23. A method of forming a chipping-resistant composite paint film according to claim 17 wherein said anti-chipping primer is applied in a dry film thickness of 1 to 20 μm and said intermediate coating is applied in a dry film thickness of 20 to 50 μm.

24. A method of forming a chipping-resistant composite paint film according to claim 18 wherein said anti-chipping primer is applied in a dry film thickness of 1 to 20 μm and said intermediate coating is applied in a dry film thickness of 20 to 50 μm.

25. The method of claim 1 wherein the range of polyester resin to melamine curing agent in the intermediate coating is 6:4 to 8:2 based upon the non-volatile matter of the polyester resin.

* * * * *

UNITED STATES PATENT AND TRADEMARK OFFICE
CERTIFICATE OF CORRECTION

PATENT NO. : 6,083,563
DATED : July 4, 2000
INVENTOR(S): Eiji Yamanaka et al.

It is certified that error appears in the above-identified patent and that said Letters Patent is hereby corrected as shown below:

Title page, Assignee should be listed as ---Nippon Paint Co., Ltd., Osaka, Japan---.

Signed and Sealed this

Seventeenth Day of April, 2001

Attest:

NICHOLAS P. GODICI

*Attesting Officer*    *Acting Director of the United States Patent and Trademark Office*